(12) United States Patent
Foster, Jr.

(10) Patent No.: US 11,328,294 B2
(45) Date of Patent: May 10, 2022

(54) ANONYMOUS PEER-TO-PEER NEAR-FIELD COMMUNICATION SYSTEM

(71) Applicant: Horus Foster, Inc., Brooklyn, NY (US)

(72) Inventor: Jack H. Foster, Jr., Brooklyn, NY (US)

(73) Assignee: Horus Foster, Inc., Brooklyn, NY (US)

( * ) Notice: Subject to any disclaimer, the term of this patent is extended or adjusted under 35 U.S.C. 154(b) by 0 days.

(21) Appl. No.: 17/099,541

(22) Filed: Nov. 16, 2020

(65) Prior Publication Data

US 2021/0176615 A1 Jun. 10, 2021

Related U.S. Application Data

(60) Provisional application No. 62/935,248, filed on Nov. 14, 2019.

(51) Int. Cl.
| | | |
|---|---|---|
| *H04B 7/00* | (2006.01) | |
| *G06Q 20/38* | (2012.01) | |
| *G06Q 20/32* | (2012.01) | |
| *G06F 16/955* | (2019.01) | |
| *G06Q 20/22* | (2012.01) | |
| *H04W 4/80* | (2018.01) | |

(52) U.S. Cl.
CPC ....... *G06Q 20/383* (2013.01); *G06F 16/9566* (2019.01); *G06Q 20/223* (2013.01); *G06Q 20/3223* (2013.01); *G06Q 20/3224* (2013.01); *G06Q 20/3227* (2013.01); *H04W 4/80* (2018.02); *G06Q 20/3278* (2013.01)

(58) Field of Classification Search
CPC ... H04W 4/80; G06Q 20/223; G06Q 20/3223; G06Q 20/3224; G06Q 20/3278
USPC .................................................. 455/41.3
See application file for complete search history.

(56) References Cited

U.S. PATENT DOCUMENTS

| | | | | |
|---|---|---|---|---|
| 8,977,234 | B2 * | 3/2015 | Chava | G06Q 20/3276 455/410 |
| 9,996,825 | B1 * | 6/2018 | Casey | G06Q 20/108 |
| 10,523,708 | B1 * | 12/2019 | Ilincic | H04L 9/3215 |
| 11,023,878 | B1 * | 6/2021 | Hernandez | G06Q 20/202 |
| 2007/0255653 | A1 * | 11/2007 | Tumminaro | G06Q 20/325 705/39 |
| 2013/0278622 | A1 * | 10/2013 | Sun | G06Q 20/3276 345/589 |

(Continued)

OTHER PUBLICATIONS

International Search Report and Written Opinion dated Mar. 12, 2021 for PCT application No. PCT/US20/60777, 18 pages.

*Primary Examiner* — April G Gonzales
(74) *Attorney, Agent, or Firm* — Perkins Coie LLP

(57) ABSTRACT

An in-application content transfer system that generates receiver IDs to categorize a given exchange between two users where one does not execute a local instance of the application. One user executes the application on their mobile device and makes use of near-field communication protocols with a neighboring mobile device that is not executing the subject application. The content transfer is linked to the receiver's phone number and a unique ID is assigned to the content transfer. The receiving user is made aware of the content transfer via a push notification received via near field communication or via an SMS text message. The received message or notification enables the user to retrieve the content from the transfer at a later time.

20 Claims, 10 Drawing Sheets

(56) References Cited

U.S. PATENT DOCUMENTS

| | | | |
|---|---|---|---|
| 2015/0095219 A1* | 4/2015 | Hurley | G06Q 20/325 |
| | | | 705/39 |
| 2015/0302398 A1* | 10/2015 | Desai | G06Q 20/367 |
| | | | 705/41 |
| 2015/0326623 A1* | 11/2015 | Albert | H04W 4/023 |
| | | | 715/753 |
| 2016/0171486 A1* | 6/2016 | Wagner | G06Q 20/3278 |
| | | | 705/39 |
| 2016/0247144 A1* | 8/2016 | Oh | G06K 7/083 |
| 2016/0267458 A1* | 9/2016 | Metral | G06Q 20/3278 |
| 2016/0267465 A1* | 9/2016 | Metral | G06Q 20/4014 |
| 2017/0068953 A1* | 3/2017 | Kim | G06Q 20/10 |
| 2017/0116603 A1* | 4/2017 | Bogaard | G06Q 20/12 |
| 2017/0147995 A1* | 5/2017 | Kalimi | G06Q 20/127 |
| 2017/0213212 A1* | 7/2017 | Dicker | G06Q 20/3829 |
| 2017/0337542 A1* | 11/2017 | Kim | G06Q 20/38215 |
| 2018/0027070 A1* | 1/2018 | Jhanji | H04L 67/1046 |
| | | | 709/217 |
| 2018/0032997 A1* | 2/2018 | Gordon | G06Q 30/0269 |
| 2018/0160282 A1* | 6/2018 | van de Poll | H04W 4/029 |
| 2018/0315051 A1* | 11/2018 | Hurley | G06Q 20/4016 |
| 2019/0057385 A1* | 2/2019 | Nair | G06Q 20/308 |
| 2019/0272539 A1* | 9/2019 | Bogaard | G06Q 30/0609 |
| 2019/0391858 A1* | 12/2019 | Studnicka | G06Q 20/326 |

\* cited by examiner

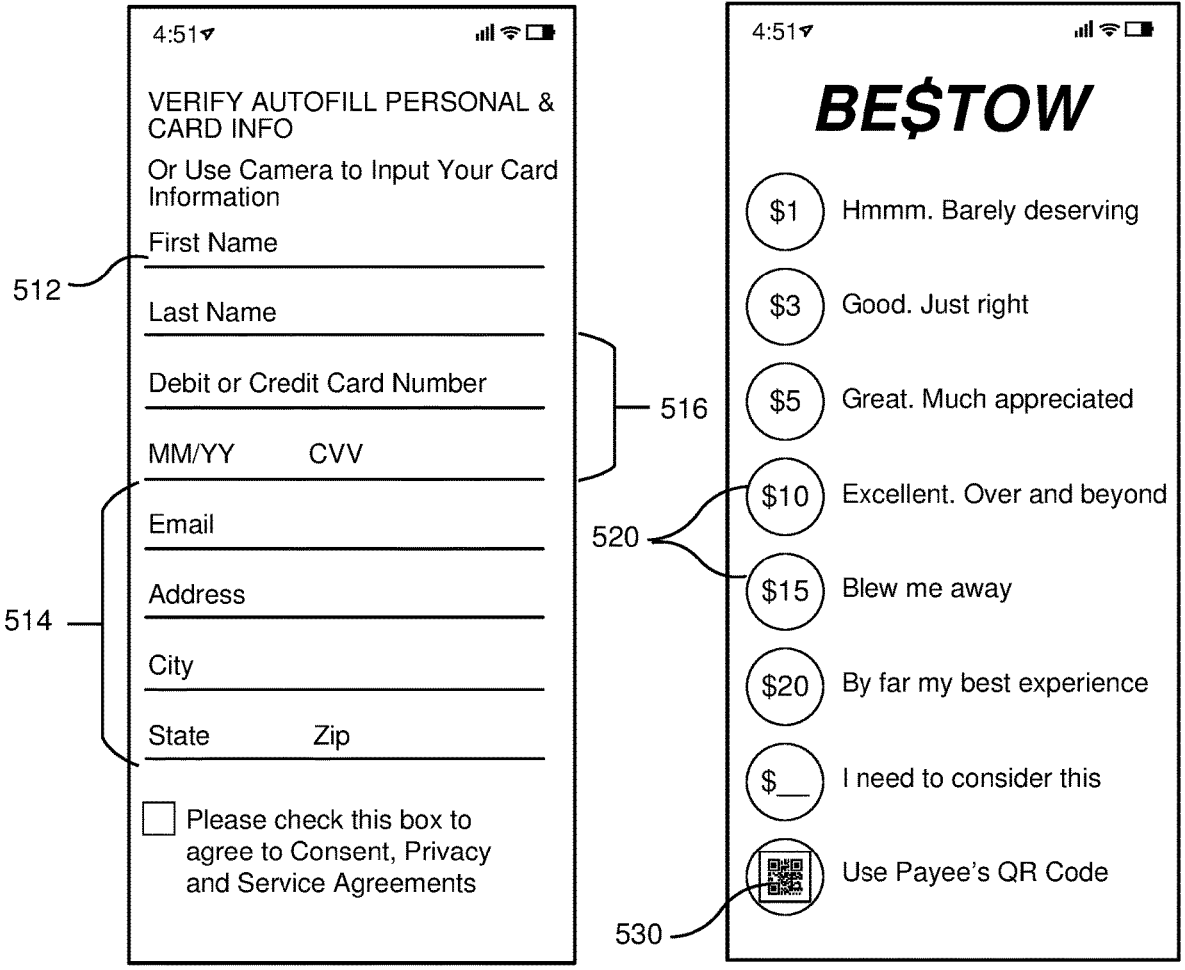
*FIG. 5B*  *FIG. 5C* ial Application No. 62/935,248, filed Nov. 14, 2019, which is
ANONYMOUS PEER-TO-PEER NEAR-FIELD COMMUNICATION SYSTEM

CROSS-REFERENCE TO RELATED APPLICATION

This application claims the benefit of U.S. Provisional Application No. 62/935,248, filed Nov. 14, 2019, which is incorporated herein by reference in its entirety.

This application is related to U.S. patent application Ser. No. 17/099,519, filed Nov. 16, 2020, and entitled "ANONYMOUS PEER-TO-PEER PAYMENT SYSTEM," which is incorporated herein by reference in its entirety.

TECHNICAL FIELD

This disclosure relates to anonymous peer-to-peer connection systems, methods, and paradigms.

BACKGROUND

Communication between users of applications is a frequent occurrence. However, these applications usually require the sender to know the recipient (at least by a pseudonym). For example, the sender usually must look up the recipient's profile using an identifier of the recipient, such as the recipient's phone number or email address, before the sender can communicate to the recipient using one of these mobile applications. If a sender does not know a recipient, or if either the sender or recipient wishes to remain as anonymous, the sender cannot use existing mobile applications to correspond with the recipient.

BRIEF DESCRIPTION OF THE DRAWINGS

FIGS. 5B-5D are screenshots showing an example payment application.

Figure 1:
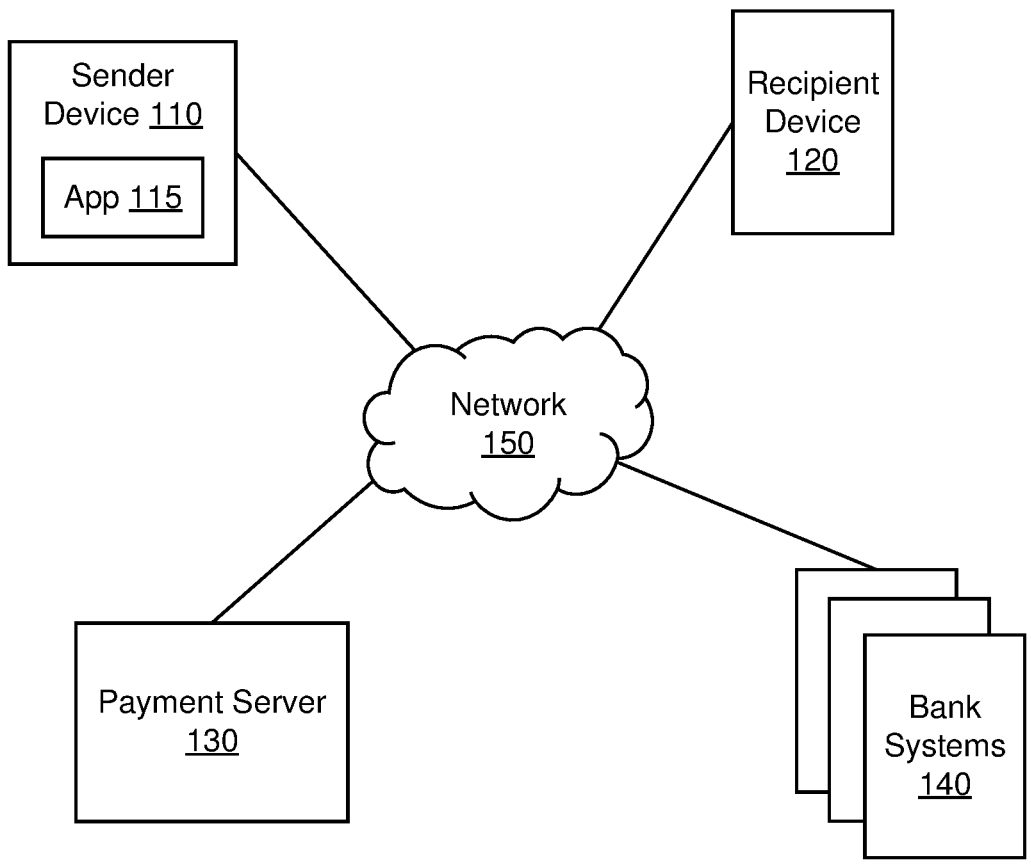
FIG. 1 is a block diagram illustrating an example mobile payment environment.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

An in-application content transfer system that generates receiver identifiers to categorize a given exchange between two users where one does not execute a local instance of the application. One user executes the application on their mobile device and makes use of near-field communication protocols with a neighboring mobile device that is not executing the subject application. The content transfer is linked to the receiver's phone number and a unique ID is assigned to the content transfer. The receiving user is made aware of the content transfer via a push notification received via near field communication or via an SMS text message. The received message or notification enables the user to retrieve the content from the transfer at a later time.

In some embodiments, a first mobile device generates an application message of a first application. That application message includes a unique identifier associated with a receiving device, a user content associated with a first user, and an interaction hyperlink associated with an interaction webpage. The identifier is associated with the receiving device as opposed to the sending device for purposes of anonymity for the sender. The use of the interaction hyperlink is based on the receiving user not having the same application executing on their respective device. The interaction webpage includes instructions to cause the receiving device to obtain the first application seeded with the unique identifier.

In some embodiments, the system makes use of transmissions via near-field communication between the two relevant devices. Upon receipt, the application interaction message generates a push notification on the second mobile device that directs the second mobile device to the interaction webpage. In response to execution of the instructions included with the interaction webpage, the application creates a new user account for the receiver connected with second mobile device and shifts the user content associated with the first user to the second user.

In some embodiments, the communication is between a single device and a backend server based upon the capture and transmission of a machine-readable code that serves as proxy for the second user.

In some embodiments, the content transferred between users is cash or money. An anonymous peer-to-peer mobile payment system and method as described herein enables donations or payments that are quick, secure, and anonymous. Embodiments of the mobile payment system enable users to transfer money without knowing the identity of the sender and the recipient. The system also does not require the recipient to download an application or create a profile before a sender can initiate a money transfer to the recipient. Money can be transferred instantly from the sender to the recipient, and the money can be transferred directly from a financial account associated with the sender to a financial account associated with the recipient without being held by a third party. The payment system described herein can therefore enable money transfer that is as ubiquitous and seamless as cash payment, without the inconvenience of carrying cash.

Some embodiments of a method for conducting an anonymous peer-to-peer payment includes receiving, at a first mobile device, an input from a first user to transfer an amount of money between a financial account associated with the first user and a financial account associated with a second user. In response to the first input, the first mobile device generates instructions to receive an identifier of a second mobile device associated with the second user. The first mobile device communicates directly with the second mobile device, for example via radio frequency communication or Bluetooth, to send a unique tokenized transaction identifier to the second mobile device using the instructions.

Using the tokenized transaction identifier, as well as an identifier of the second mobile device, a payment server is configured to cause the transfer of the indicated amount of money between the financial account associated with the first user and the financial account associated with the second user. The use of the tokenized transaction identifier to conduct the transaction, rather than an identify of a user or other personal information, enables the users of the first and second devices to conduct a transaction anonymously.

In some embodiments, a non-transitory computer readable storage medium stores executable computer program instructions that cause a processor in a first mobile device to render a display on the first mobile device. The display includes user interface elements enabling a first user of the first mobile device to select an amount of money to transfer from a financial account associated with the first user to a financial account associated with a second user. In response to an input by the first user at one of the user interface elements on the display to indicate the selected amount of money, the processor generates instructions to retrieve an identifier of a second mobile device associated with the second user over a direct communication channel. After retrieving the identifier of the second mobile device over the direct communication channel, the processor causes a transfer of the selected amount of money between the financial account associated with the first user to the financial account of the second user using the identifier of the second mobile device.

In some embodiments, a method for conducting an anonymous peer-to-peer payment includes receiving, at a first mobile device, an input from a first user to request a transfer of an amount of money from a financial account associated with a second user to a financial account associated with the first user. The first mobile device communicates directly with a second mobile device used by the second user to retrieve an identifier of the second mobile device. The first mobile device sends the identifier of the second mobile device and the amount of money to a payment server, which is configured to cause the transfer of money between the financial account associated with the second user and the financial account associated with the first user using the identifier of the second mobile device.

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying embodiments.

The disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be executed to test a video game.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like may refer to any connection or coupling, either direct or indirect, between two or more elements. The coupling or connection between the elements can be physical, logical, or a combination thereof.

Reference to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

System Overview

FIG. 1 is a block diagram illustrating an example mobile payment environment. As shown in FIG. 1, a mobile payment environment can include a sender device 110, a recipient device 120, a payment server 130, and one or more financial systems 140. The sender device 110, recipient device 120, payment server 130, and/or financial systems 140 can communicate over a network 150.

The sender device 110 is a mobile device used by a person who wants to give money to another person (referred to herein as a "sender"). The sender device 110 can be any mobile computing device capable of displaying information to a user, receiving inputs from a user, and/or communicating over a network. Example devices usable as the sender device 110 include a mobile phone, a tablet, or a wearable device such as a smart watch. The sender device 110 can be additionally configured to communicate over a direct peer-to-peer link, such as radio frequency communication (including radio frequency identification (RFID) or near-field communication (NFC)), Bluetooth, APPLE AIRPLAY, or ultra-wideband communication. Thus, various embodiments of the sender device 110 include transceivers, chipsets, or other hardware enabling communication over a network and/or communication over one or more types of direct peer-to-peer channels. The sender device 110 can further include a global positioning (GPS) sensor configured to detect and output a location of the sender device 110.

The sender device 110 includes one or more processors that execute a payment application (or "app") 115. The payment app 115 generates an interactive user interface that can be displayed to the sender on a display associated with the sender device 110 and receive inputs from the sender via an input device associated with the sender device 110. By interacting with the payment app 115, the sender can create a profile with the payment server 130, initiate transactions, approve transactions initiated by the recipient, and review previous transactions. The payment app 115 sends profile information to the payment server 130, which maintains the profile in association with an identifier of the sender device 110. For example, when the sender uses the payment app 115 to create the profile with the payment server 130, the payment app 115 retrieves the identifier of the sender device 110 and sends the identifier to the payment server 130 in association with other profile information. In some cases, the sender may create multiple profiles with the payment server 130 and use the payment app 115 to select an applicable profile when initiating a transaction. For example, a sender may create a business profile, under which transactions related to the sender's business expenses can be initiated and managed, and a personal profile, under which personal transactions can be initiated and managed.

To initiate a payment from the sender to a recipient, the sender device 110 can generate a tokenized transaction identifier that is transmitted to the recipient device 120 via a direct communication channel. Information about the transaction—such as an identity of the sender and the amount of money to transfer—is encoded into the tokenized transaction identifier generated uniquely for each transaction. In some embodiments, the tokenized transaction identifier is transmitted in a uniform resource locator (URL), which when accessed on the recipient device 120 causes the recipient device to perform one or more actions. can retrieve a unique identifier associated with the recipient. In some embodiments, the sender device 110 is configured to retrieve the recipient identifier over a direct peer-to-peer communication channel between the sender device 110 and recipient device 120. For example, the unique identifier can be a device identifier associated with the recipient device 120, such as an international mobile equipment identity (IMEI), a mobile equipment identifier (MEID), and/or a secure element identifier (SEID). In other cases, the sender device 110 can retrieve an identifier of the recipient by reading a visible code displayed by the recipient device 120 or printed on a sign. For example, a camera of the sender device 110 can be used to capture a quick response (QR) code that encodes an identifier of the recipient that can be read by the sender device 110.

The recipient device 120 is a mobile device used by a person who receives money from a sender (referred to herein as a "recipient"). Like the sender device 110, the recipient device 120 can be any mobile computing device capable of displaying information to a user, receiving inputs from a user, and/or communicating over a network, including devices such as a mobile phone, a tablet, or a wearable device such as a smart watch. Furthermore, the recipient device 120 may be configured to communicate over a direct peer-to-peer link, such as radio frequency communication (including radio frequency identification (RFID) or near-field communication (NFC)), Bluetooth, APPLE AIRPLAY, or ultra-wideband communication. In some embodiments, the direct peer-to-peer link may have a proximity limiter to ensure that only the intended recipient receives the funds.

The recipient device 120 may also execute the payment app 115, enabling the recipient to create a profile with the payment server 130, initiate transactions, and review past transactions. In some cases, the recipient may create multiple profiles with the payment server 130, such as personal and business profiles, and use the payment app 115 to select an applicable profile when initiating a transaction. The recipient device 120 may not have the payment app 115 installed when the sender initiates a transaction.

In some embodiments, the recipient device 120 can be used to initiate a financial transaction by soliciting money from the sender. For example, the recipient device 120 can generate instructions to retrieve a unique identifier of the sender device over direct peer-to-peer communication. The recipient can use the payment app 115 to request money from the sender. If the transfer is confirmed by the sender, the payment app 115 can send the identifier of the sender device 110, an identifier of the recipient device 120, and an indication of the amount of money requested to the payment server 130 to conduct a transaction.

In some embodiments, the recipient device 120 can be a dedicated device for mobile payments, with otherwise limited capabilities. The recipient device 120 can be, for example, a dedicated NFC or RFID module, either carried by a person or fixed in a convenient location, that outputs an identifier associated with the recipient when queried by the sender device 110. By way of example, an NFC module can be fixed to or near a valet stand. Patrons of the valet can use sender devices 110 to scan the NFC module and initiate a transaction to tip the valet staff. In some embodiments, rather than an NFC module, a machine-reachable code placard is used instead. The machine-readable code is associated with the receiver. Examples of machine-readable codes include barcodes and/or QR codes. The payment server 130 records the GPS location of the machine-readable code placard. The GPS location of the placard may be compared against the GPS location of the sender in order to verify authenticity of the transaction (e.g., that the sender is physically present by the placard).

The mobile payment environment can include any number of sender devices 110 and recipient devices 120. In addition, although the sender device 110 and recipient device 120 are depicted in FIG. 1 as being different devices, some implementations of the recipient device 120 are similar or identical to some implementations of the sender device 110. Furthermore, a device that functions as a sender device 110 in one transaction can be used as a recipient device 120 in another transaction, and a device that functions as a recipient device 120 can be used alternatively as a sender device 110.

The payment server 130 facilitates the transfer of money from the sender to the recipient. The payment server 130 can interface between the sender device 110 and financial systems 140 to facilitate payments initiated at the sender device 110 or recipient device 120. The payment server 130 can maintain user profiles associated with senders and recipients, enabling the payment server 130 to identify the sender and recipient without the sender or recipient exchanging personal information with one another. The payment server 130 furthermore provides the payment application 115 for execution by the sender device 110 and/or recipient device 120, either directly sending the payment app 115 to the user devices or providing access to it through another portal, such as an app store. In various implementations, the payment server 130 can include one or more computing devices, a distributed cloud computing system, or another configuration of computing devices that are capable of communicating over the network 150 and processing transaction information. The payment server 130 is described further with respect to FIG. 2.

The financial systems 140 are computer systems that maintain financial accounts associated with users of the payment server. The financial accounts can include any of a variety of types of accounts that the sender and recipient can readily transfer money into or out of, such as checking accounts, savings accounts, or lines of credit. In some embodiments, the financial systems 140 include or integrate with other payment or mobile wallet services, such as Apple Wallet, Google Wallet, Paypal, Venmo, or Cash App. The financial systems 140 can be configured to transfer money from a sender's account to a recipient's account in response to transfer instructions that identify the accounts and specify an amount of money to transfer.

The network 150 enables communication between the sender device 110 or recipient device 120 and the payment server 130 and/or financial systems 140. In various embodiments, the network 150 may include one or more local area networks (LANs), wide-area networks (WANs), metropolitan area networks (MANs), and/or the Internet.

Figure 2:
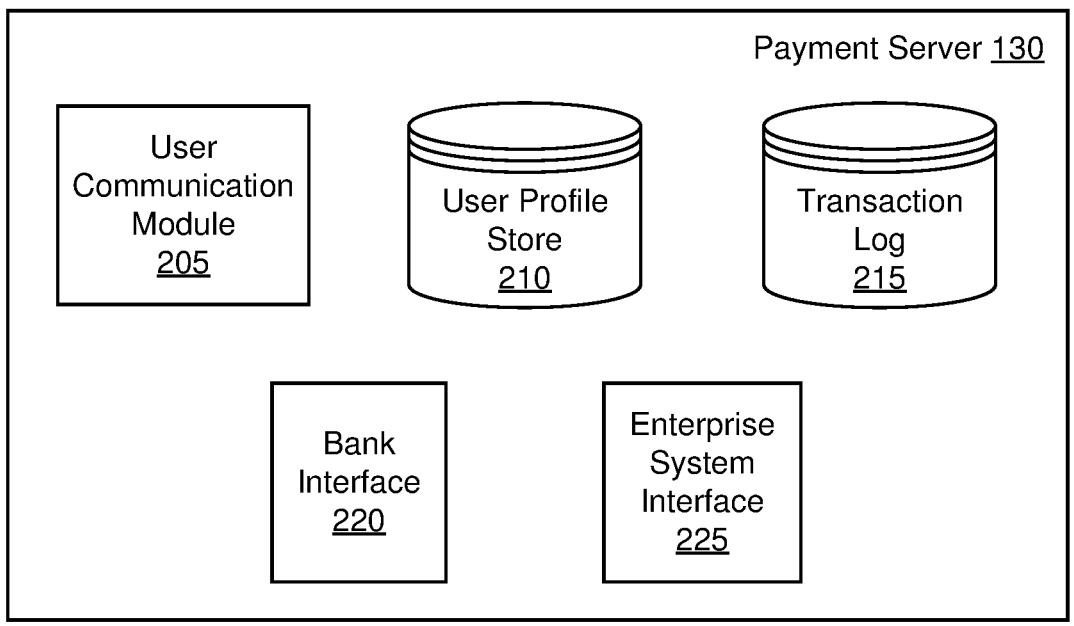
FIG. 2 is a block diagram illustrating example modules executed by a payment server.

FIG. 2 is a block diagram illustrating modules executed by the payment server 130, according to some embodiments. As shown in FIG. 2, the payment server 130 can execute a user communication module 205, a financial system interface 220, and an enterprise interface 225, and can maintain a user profile store 210 and a transaction log 215. The modules shown in FIG. 2 can be software modules executed by a processor of the payment server 130, hardware modules, or a combination of software and hardware. In other embodiments, the payment server 130 can execute additional, fewer, or different modules, and functionality can be distributed differently between the modules.

The user communication module 205 communicate with user devices (such as the sender device 110 and recipient device 120) to register users to the payment server and receive information about transactions. For example, the sender can enter profile information, including name, phone number or email address, and/or financial account information, into the payment app 115 executed by the sender device 110, and the user communication module 205 can communicate with the payment app 115 to receive the sender's profile information. The user communication module 205 may also retrieve other information about the sender that is not manually entered by the sender, such as a unique identifier of the sender device 110 (e.g., by querying the device 110 for the identifier) or a geographic location to be associated with the sender's profile (e.g., by querying a GPS sensor on the sender device 110). Based on the information, the user communication module 205 creates a profile for the sender. The profile can be stored in the user profile store 210, indexed by an identifier of the sender device 110. Similarly, the user communication module 205 can create a profile for the recipient based on information received from the recipient device 120, storing the profile in the user profile store 210 indexed by an identifier of the recipient device 120.

The user communication module 205 can also communicate with the payment app 115 on the sender device 110 or recipient device 120 to conduct transactions. When a sender device 110 sends the user communication module 205 an identifier of the recipient device 120 to initiate a transaction, the user communication module 205 queries the user profile store 210 based on the recipient device identifier to determine if the recipient has created a profile with the payment server. If the query returns no profiles, the user communication module 205 send instructions to the recipient device 120 to guide the recipient through downloading the payment app 115 and creating a profile. The user communication module 205 can also query the user profile store 210 using an identifier of the sender device 110 to retrieve a profile of the sender.

In some embodiments, if either a sender or a recipient has multiple profiles linked to their respective identifiers, the user communication module 205 selects a profile to use for the transaction. The profile may be selected based on explicit user input, such as the sender selecting one of his profiles using the payment app 115 before or after initiating the transaction. Alternatively, the user communication module 205 can select the profile based on one or more rules. In some embodiments, the user communication module 205 applies a geofencing rule associated with one of the profiles. For example, if the recipient has both a business profile and a personal profile, the business profile may be associated with the geographic location of the recipient's business and a geofencing rule is applied to ensure that the business profile is used whenever the recipient is at the location of the business. If the recipient is inside of a geofence surrounding the business location, the user communication module 205 may automatically select the recipient's business profile to conduct the transaction. If the recipient is outside the geofence, the user communication module 205 may automatically select the recipient's personal profile. The user communication module 205 may use other rules in addition to or instead of geofencing rules to select the applicable profile, such as selecting a profile based on time of day or day of the week when the transaction was initiated.

Geofencing rules may also be applied to prevent fraud. Where both users are executing the application, and their devices facilitate the transfer via NFC, the GPS location on of each device is checked via onboard GPS sensors. In a non-fraudulent transfer, both devices should be co-located within a given geographic radius of one another (as established via a geofence).

If the recipient has created a profile, the user communication module 205 can retrieve the financial account information for the sender and the recipient by querying the user profile store 210. The financial account information can be passed to the financial system interface 220 to generate instructions to transfer the amount of money specified by the sender. The user communication module 205 can then write transaction data associated with the transaction to the transaction log 215.

The transaction log 215 stores transaction data associated with user transactions. For each transaction, the transaction data can include the identifiers of the sender and recipient, the amount of money transferred between the sender and recipient, time or date of the transaction, locations of the sender or recipient at the time the transaction was initiated (stored, for example, as global positioning coordinates, an address, or a name of an establishment within which the transaction was initiated), a service type associated with the transaction (e.g., housekeeping, bellhop, or valet), or a custom memo entered by the sender or recipient. In some cases, the payment app 115 may allow the sender or recipient to categorize a transaction from either a preselected or customized list of transaction categories, such as friend, service, or charity. Furthermore, if the transaction is associated with an enterprise, the sender or recipient may add or select an expense code or other label for categorizing or tracking the transaction in an enterprise system. The categories or other labels can also be stored in the transaction log 215.

The financial system interface 220 generates transfer instructions to cause a transfer of money from the financial account associated with the sender to the financial account associated with the recipient. The financial system interface 220 can send the transfer instructions to the financial system 140 associated with the sender's account, for example via an application programming interface (API) provided by the financial system 140, thereby causing the financial system 140 to transfer money to the recipient.

The enterprise interface 225 can communicate with one or more enterprise systems to upload transaction data to the enterprise systems. For example, the enterprise interface 225 can generate structured data that can be input to an enterprise system via an enterprise system API. The enterprise systems can be any system associated with a business and enabling the business to track its expenses. For example, the enterprise system may be a tool that tracks travel-related expenses of a business' employees, including the amount the employees tip for services at hotels, valets, or the like. Alternatively, the enterprise system can be an accounting system associated with a business that receives tips, such as a valet service. The interface between the payment server 130 and accounting system enables the business to track the incoming payments. Still another example enterprise system is a personal tax management tool, such that uploading the transaction data to the tax management tool allows individuals to track their charitable giving for filing with their annual tax return. In some embodiments, the enterprise interface 225 uploads the transaction data to an enterprise system if the sender or recipient profiles is associated with an enterprise system. For example, when a recipient creates a business profile for receiving tips or other payments related to the recipient's employment, the profile can include credentials for the enterprise system that enables the enterprise interface 225 to upload transaction data.

Anonymous Peer-to-Peer Payments

Interactions between the sender device 110, recipient device 120, and payment server 130 enable a variety of types of mobile payments. In an example application, a person can use the payment system to tip a gratuity to hotel staff, such as a parking valet or a bellhop. The sender can, for example, tap a mobile device carried by the hotel staff member or scan a QR code (positioned near the valet stand, for example) to automatically send a gratuity to the staff member without needing to carry cash. As another example, a sender can use the payment system to pay for a delivery service. The sender can pay for the full cost of the goods and delivery using the payment system, or can use the payment system to tip the delivery driver. In still other examples, a sender can use the payment system to donate to a charitable organization or an unhoused person while allowing both parties to remain anonymous. Other transactions can be initiated by the recipient of money. For example, a charity may initiate a transaction to solicit money from a donor. The charity may request a specific amount of money, which the sender can approve or reject. Alternatively, the charity may request a payment without specifying the amount of money, and the sender can choose the amount of money to donate to the charity.

Figure 3:
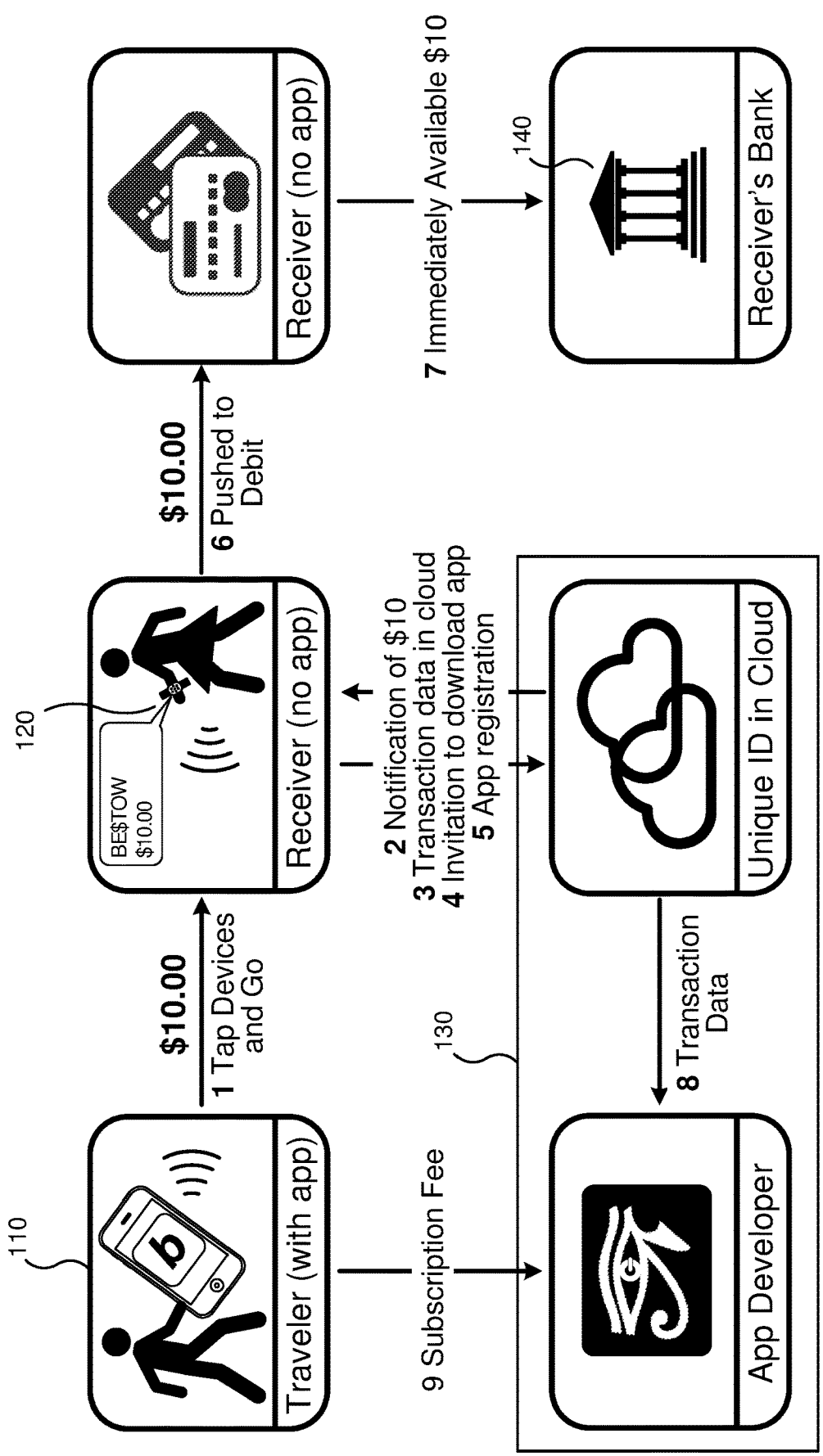
FIG. 3 is a diagram illustrating an example process for making anonymous peer-to-peer payments.

FIG. 3 is a diagram illustrating an overview of an example anonymous peer-to-peer payment. As shown in FIG. 3, peer-to-peer payments can include interactions between the sender device 110, the recipient device 120, the payment server 130, and the financial systems 140.

To initiate a payment, the sender can initiate a process using the sender device 110 to send a tokenized transaction identifier to the recipient device 120. For example, the sender can select an option in the payment app 115 that initiates a transaction. In some embodiments, the sender device 110 transmits the transaction identifier by generating a request that is output when an NFC transceiver of the sender device 110 comes into range of an NFC transceiver of the recipient device 120. For example, after selecting the option in the payment app 115, the sender device 110 begins emitting a signal via the NFC transceiver that causes the sender device 120 to send a URL containing the transaction identifier to the recipient device 120 when the sender taps the device 110 against the recipient's device 120. The sender device 110 can use communications protocols other than NFC.

After the sender initiates the transaction, the recipient device 120 can receive and display a notification indicating the amount of money the sender is sending to the receiver. In some embodiments, the notification can be a notification displayed on a webpage accessed by the recipient device 120 using the URL. In other embodiments, the notification can be a push notification that the sender device 110 causes to be displayed by the recipient device 120 when the sender device 110 is tapped against the recipient device 120, or an SMS message or another type of message that can notify the recipient about the payment.

If the recipient device 120 does not have the application 115, the URL can include information to assist the recipient in downloading the application 115. For example, the URL may include a link that directs the recipient to the payment application 115 in an app store. Alternatively, URL can contain instructions that causes the recipient device 120 to open the payment app 115 in an app store, enabling the recipient to immediately download the payment app 115. Once the recipient downloads the application 115, the recipient can register the application and create a profile, including entering financial account information that will allow the payment server 130 to transfer money to the recipient.

Where the receiver does not have the application, the transaction content (money) is still removed from the sender's account and is held by the payment server 130 until the receiver designates a receiving account to send the content to. The content is held under a unique ID generated for the receiver. In some embodiments, the receiver's phone number is used as the unique ID. The phone number is identified via NFC communication with the device and not revealed to the sender.

In some embodiments, the sender device 110 uses NFC by default to transfer data when both the sender device 110 and recipient device 120 have the application 115 installed. If the recipient device 120 does not have the app 115 installed, the sender device 110 may send the URL over a communications protocol defined based on attributes of the sender device 110 and recipient device 120. For example, if the sender device 110 is a mobile device executing the ANDROID operating system, the sender device 110 may send the URL over NFC. If the sender device 110 is a mobile device executing the APPLE IOS operating system, the sender device 110 may use APPLE AIRPLAY to send the URL to a recipient device 120 also executing IOS and BLUETOOTH to send the instructions to a recipient device 120 that executes ANDROID. In some embodiments, the instructions are sent via a tokenized link that is unique to the transaction.

The sender device 110 or the recipient device 120 sends the tokenized transaction identifier and an identifier of the recipient device 120 to the payment server 130. Using the tokenized transaction identifier and the identifier of the recipient device 120, the payment server 130 identifies the recipient and accesses a profile associated with the recipient. The payment server 130 stores the information received from the sender device 110 as transaction data.

The payment server 130 can generate bank transfer instructions to cause a transfer of money from the sender to the recipient. The bank transfer instructions specify a financial account associated with the sender (which is stored, for example, in the sender's user profile), a financial account associated with the recipient (stored, for example, in the recipient's user profile), and the amount of money the sender wishes to send to the recipient. The payment server 130 sends the instructions to the financial system that maintains the sender's account, causing the financial system to transfer the amount of money specified by the sender from the sender's account to the recipient's account.

Figure 4:
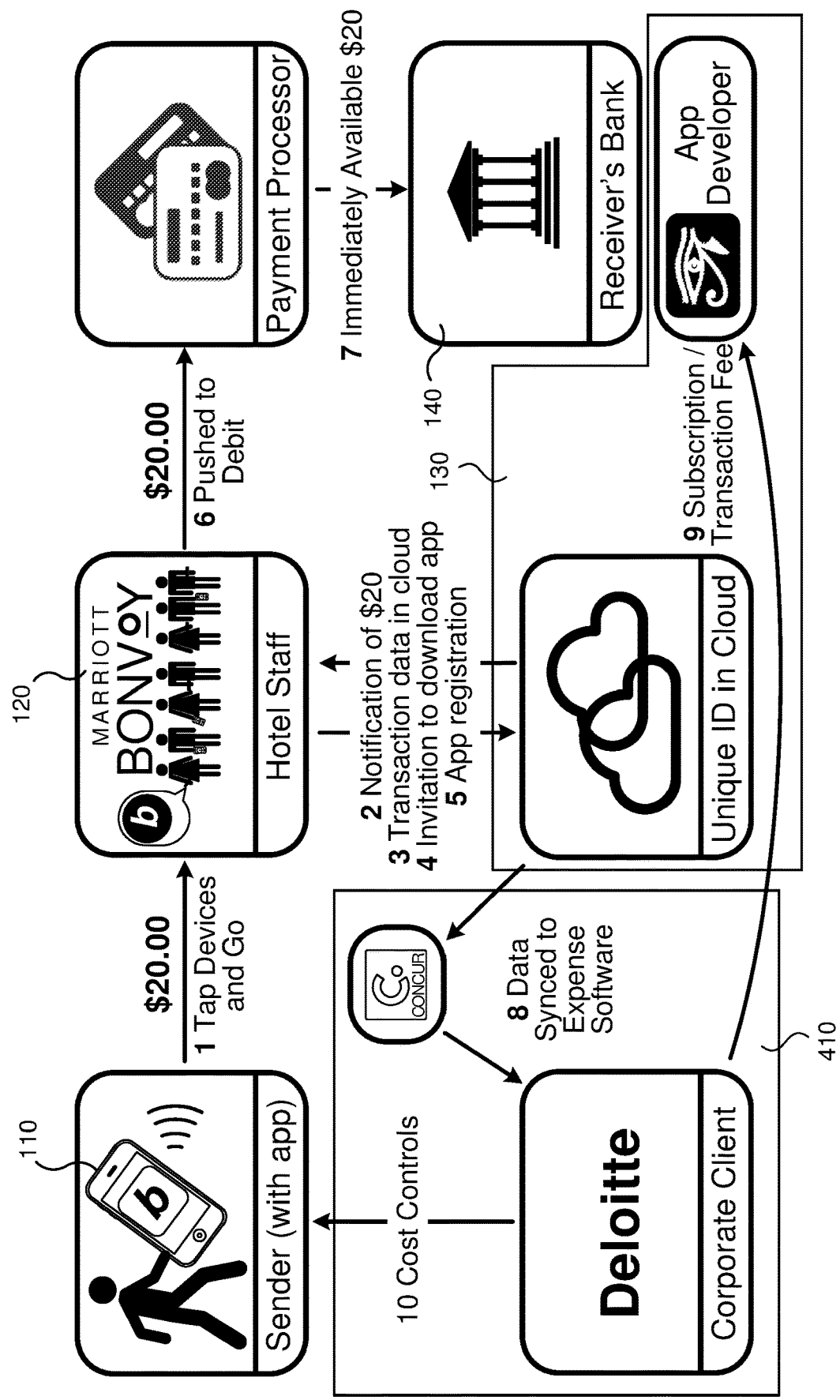
FIG. 4 is a diagram illustrating another example process for making anonymous peer-to-peer payments.

FIG. 4 is a diagram illustrating an overview of another example anonymous peer-to-peer payment. Like the process in FIG. 3, the process shown in FIG. 4 can include interactions between the sender device 110, the recipient device 120, the payment server 130, and the financial systems 140. In addition, the process shown in FIG. 4 may include interactions between the payment server 130 and enterprise software 410 associated with an employer of the sender or the recipient. The process shown in FIG. 4 is described, by way of example, as a process used when a business traveler tips hotel staff. However, a similar process can be used for any of a variety of types of payments.

As shown in FIG. 4, the traveler uses the payment app 115 executed by the sender device 110 to initiate a transaction. The traveler can, for example, tap the sender device 110 against a recipient device 120 associated with the hotel staff member the traveler wishes to tip, or the traveler can scan a QR code or input another type of code (such as scanning a QR code displayed in a room for tipping housekeeping staff). The traveler can also use the payment app 115 to specify the amount of money he wishes to tip, which in the example of FIG. 4 is $20. In some cases, the traveler may select a category or expense code associated with the expense for tracking the tip in an enterprise system associated with the traveler. The recipient device 120 receives a notification of the tip and displays the notification to the hotel staff member.

The sender device 110 retrieves a unique identifier of the recipient and sends the recipient identifier and the amount of money to the payment server 130. If the recipient has created an account with the payment server 130, the payment server 130 accesses the recipient's profile using the recipient identifier. If the recipient has not created an account, the payment server 130 can send information to the recipient device 120 to download the application 115 and creating a profile to enable the recipient to receive the payment.

If the recipient as already created a profile, or after the recipient creates a new profile, the payment server 130 generates instructions to transfer money from a financial account associated with the sender to a financial account associated with the recipient. The payment server 130 sends the instructions to the financial system that maintains the sender's account, causing the financial system to transfer the amount of money specified by the sender from the sender's account to a specified account associated with the recipient.

The payment server 130 stores transaction data associated with the transaction, including identifiers of the sender and the recipient and the amount of money, as well as optionally one or more of time of the transaction, date of the transaction, a location of the sender or recipient when the transaction was initiated, or a category associated with the transaction.

In some embodiments, the payment server 130 communicates with enterprise software 410 to upload the transaction data to the enterprise software 410. For example, the payment server 130 can format the transaction data into a SQL data format readable by the enterprise software 410. The enterprise software 410 can use the transaction data to track expenses associated with the enterprise. The payment server 130 may upload transaction data to enterprise systems associated with the sender, the recipient, or both, depending on whether the sender or recipient profiles used for the transaction are linked to enterprise systems.

The enterprise software 410 can, in some cases, communicate with the payment application 115 on the sender device 110 to impose cost controls. The cost controls may, for example, set limits on amounts of money the sender can tip in a given transaction or over a specified period of time (such as a day or a designated period of time associated with a business trip). The payment application 115 may communicate directly with the enterprise software 410, or the enterprise software 410 may set the cost controls through the payment server 130.

Conducting Anonymous Peer-to-Peer Transactions

Figure 5A:
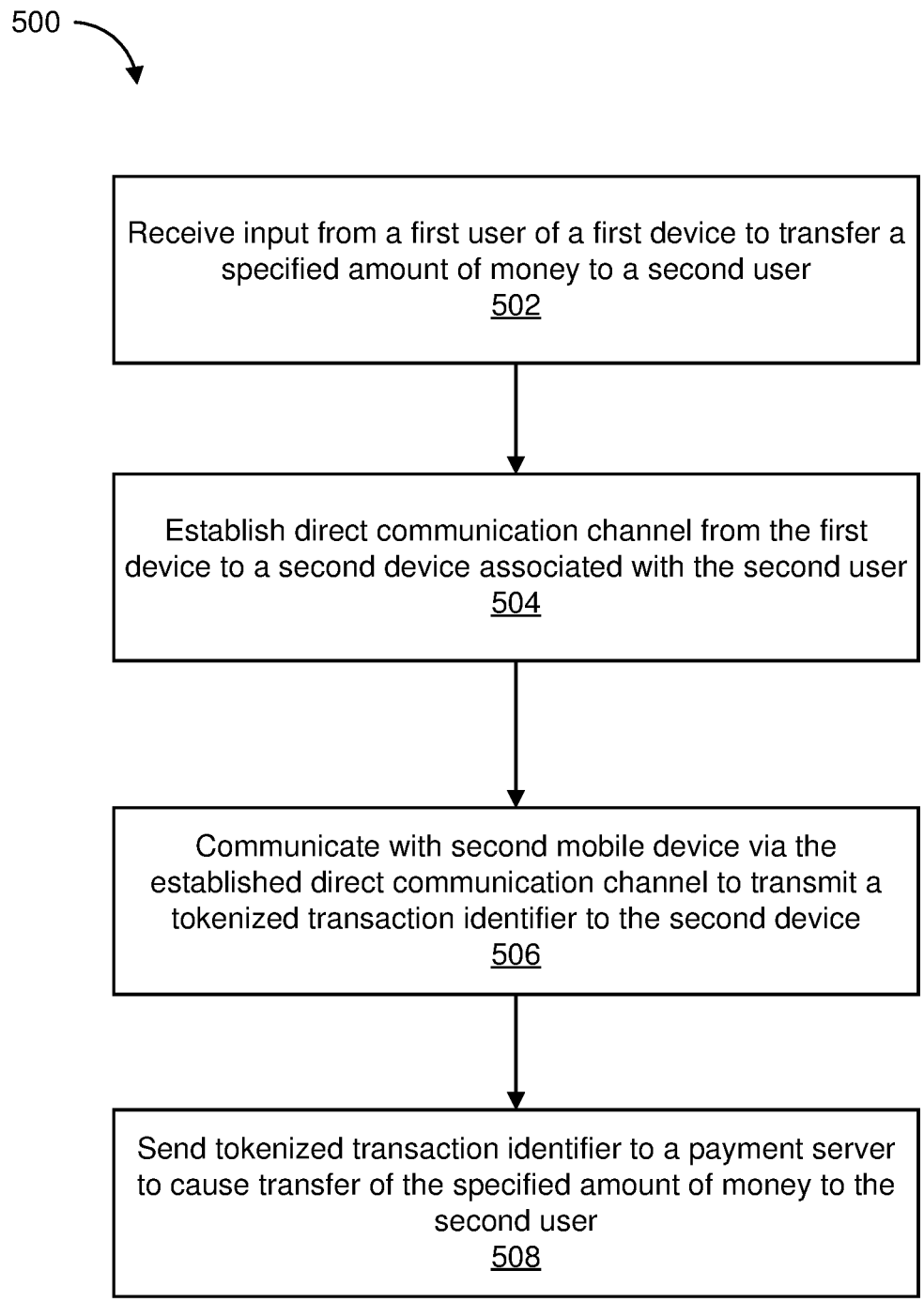
FIG. 5A is a flowchart illustrating a process for initiating an anonymous peer-to-peer payment.

FIG. 5A is a flowchart illustrating a process 500 for initiating an anonymous peer-to-peer payment, according to some embodiments. The process shown in FIG. 5A can be performed by a first mobile device, such as the sender device 110, that executes the payment application 115 and is used by a first user who is sending money to a second user. The process is described with respect to FIGS. 5B-5D, which illustrate example interfaces displayed by the payment application 115.

Prior to making a peer-to-peer payment, the first user can use the payment application 115 to establish an account with the payment server 130. An example registration screen is shown in FIG. 5B. The registration screen can include fields 512 to enter a name of the first user and fields 514 to enter contact and/or billing information, such as an email address and a billing address. Furthermore, the registration screen can include fields 516 for manually entering financial account information. FIG. 5B illustrates by way of example that the fields enable the first user to input a debit or credit card number, but the fields 516 may additionally or alternatively include fields to enter bank account information, login credentials for another payment application, or other financial information. In some cases, the application 115 may either enable the sender to manually enter the debit or credit card information or autofill the information based on a photograph of the card. Alternatively, the user may grant the application 115 access to personal details stored on the device 110 rather than manually entering the information. Once the first user has established an account by entering the information into the registration screen, the payment application 115 stores the user's account information locally or at the payment server 130 for use during peer-to-peer payment transactions.

Referring to FIG. 5A, the first mobile device receives, at block 502, an input from the first user to transfer an amount of money between a financial account associated with the first user and a financial account associated with a second user. The input can be received at a display generated by the payment application 115, which includes user interface elements enabling the first user to select the amount of money to transfer to the second user. An example display for specifying an amount of money is shown in FIG. 5C. As shown in FIG. 5C, the payment application 115 can in some embodiments provide one or more buttons 520 that, when selected, each initiate a transaction for a different amount of money. For example, if the sender selects (e.g., taps) the $5 button, the application 115 initiates a transaction to send a recipient $5. The sender may therefore initiate a payment of $5 to a recipient by selecting the $5 button and tapping the sender device 110 against the recipient device 120. The buttons 520 provided by the application 115 may indicate any of a variety of different amounts of money, and in some cases may allow the sender to manually enter the amount of money he wishes to send. When a button 520 is selected, the application 115 can generate the instructions to retrieve the recipient device identifier and begin broadcasting the instructions by the NFC transceiver, such that if the transceiver is moved into range of the recipient device's transceiver within a specified amount of time (such as ten seconds), the application 115 retrieves the recipient device identifier and sends the transaction information to the payment server 130 to conduct the transaction.

In some embodiments, the amounts of money displayed on the set of buttons 520 are preset. In other embodiments, the payment app 115 selects the different amounts of money to display on the buttons 520 based on characteristics of the sender, the region in which the sender is currently located, or the specific location of the sender. For example, the payment app 115 may generate buttons 520 for different amounts of money when the sender is at different locations. The different amounts of money may be preset by a developer of the payment app 115 or may be computed based on payments by other users at the location. For example, if visitors to a particular hotel tip the hotel staff an average of $20, the payment app 115 may generate a set of buttons 520 that together have a median value of $20. If visitors to a different hotel tip the hotel staff an average of $10, the payment app 115 may generate a different set of buttons 520 that together have a median value of $10. Alternatively, the values of the buttons 520 may be selected based on transaction history of the sender using the app, such as the amounts of money selected by the sender during previous transactions. For example, if the average amount of money transferred in the sender's previous transactions is $10, the payment app 115 generates a set of buttons that together have a median value of $10. As another example, if the sender tips an average of $10 when using a business profile and an average of $5 when using a personal profile, the payment app 115 may generate buttons with higher median values when the sender is using the business profile than when the sender is using the personal profile. The values of the buttons 520 can be selected differently based on one or more policies. For example, the payment app 115 can implement a policy that generates a set of buttons with a median value that is higher, by an amount specified in the policy, than the actual average payment by the sender or by other users at the location of the sender.

In some embodiments, the money transfer application is supervised by a corporate entity. The corporate entity may assign the user an allowance and may review all transfers and set limits. Limits that may be set on a sender are temporal restrictions (e.g., while the sender is on a business trip, during business hours, or during happy hour-hours), locational restrictions (e.g., the GPS verified location of a business trip, not the GPS location of some select "unprofessional" businesses), or receiver restrictions (e.g., specific businesses or staff of those businesses). Limits may also be set based on customary or average amounts for the given location and business (e.g., the average tipped for hotel staff/waiters/bellmen/valet in a given metropolitan area and for a given hotel/restaurant quality).

Figure 5D:
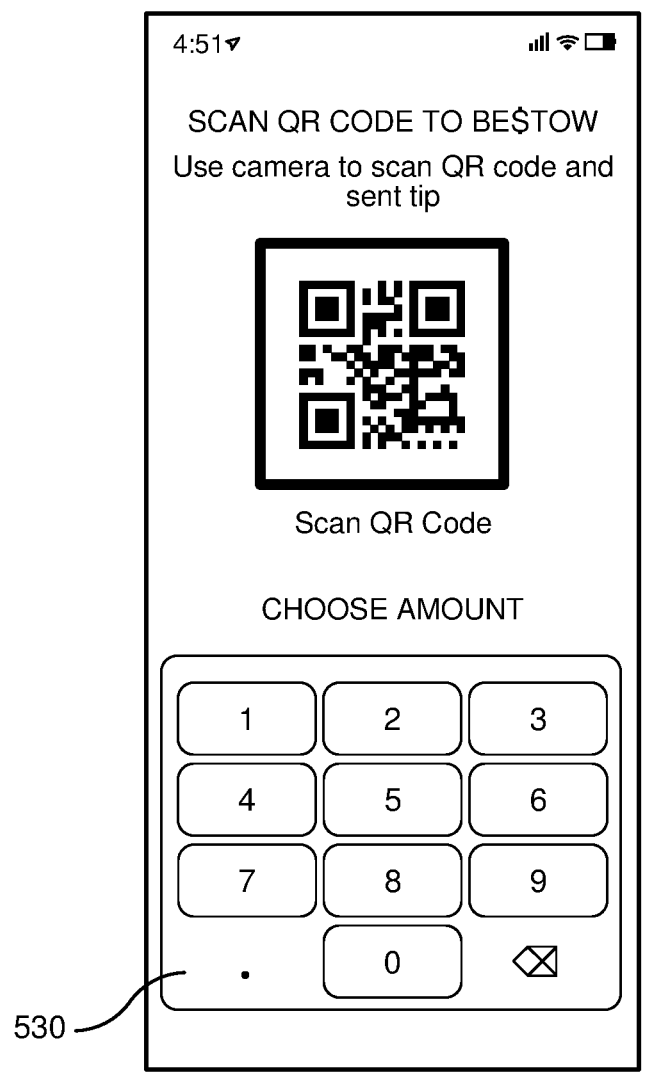

In some cases, rather than selecting one of the buttons 520 to initiate the transaction, the sender can select an option 530 to scan a QR code associated with the recipient. The QR code can be, for example, generated and displayed by the payment application 115 executed by the recipient device 120. Alternatively, the QR code can be printed and displayed at a convenient location, such as a valet stand. An example screen displayed by the sender device 110 to allow the sender to scan the QR code is shown in FIG. 5D. In some cases, the sender can use a camera of the sender device 110 to scan the recipient's QR code, then can enter an amount of money using the keyboard 530. Once the sender enters the amount, the sender device 110 can transmit the amount and information read from the QR code to the payment server 130 to conduct the transaction. In other cases, the application 115 may provide buttons specifying different amounts of money, similar to the buttons 520 shown in FIG. 5C.

In some cases when the first user provides the input to transfer an amount of money, the user's input is associated with one of multiple profiles associated with the first user. For example, as described above, a user may have separate business and personal profiles associated with his or her payment server account. When providing the input for a given payment, the first user may manually specify the profile to which the payment should be associated. In other cases, the payment application 115 automatically selects the profile based on rules associated with the profile. For example, a business profile can include a time-based rule that will cause the payment application 115 to associate a payment with the business profile during specified work hours (e.g., 8 am to 5 pm) and not associate payments to the business profile outside of the specified time window. Another example rule is a geofencing rule, causing the payment application 115 to associate the payment with the business profile when the first mobile device is inside of a specified geofence (e.g., an employer's campus) and not associate the payment with the business profile when the first mobile device is outside of the geofence. In still another example, a user's business profile is associated with cost controls imposed by the enterprise server, for example specifying a limit for an amount of money the user can debit against the business profile in a given day. If the user has not exceeded the limit specified by the cost controls, the payment application 115 can associate the transaction with the business profile; if the limit has been exceeded, the transaction is associated with the user's personal profile instead.

At block 504, the first mobile device establishes a direct communication channel with a second device associated with the second user. For example, the first mobile device performs a handshake procedure to connect to the second device using Bluetooth. In another example, the first mobile device begins outputting a signal by a radio frequency or NFC transceiver that is detectable by a corresponding second device transceiver when the first mobile device comes into proximity to the second device.

At block 506, the first mobile device communicates with the second mobile device via the established communication channel to send a tokenized transaction identifier associated with the transaction to the second mobile device. The transaction identifier can be transmitted via a URL that includes instructions to cause the recipient device to perform one or more actions. An action can include displaying information to the second user, such as the amount of money the first user is transferring to the second user or instructions to download the mobile payment application. For example, the URL may include a link that directs the recipient to the payment application 115 in an app store. Another example action includes causing the second mobile device to open the payment app 115 in an app store, enabling the recipient to immediately download the payment app 115. Once the recipient downloads the application 115, the recipient can register the application and create a profile, including entering bank account information that will allow the payment server 130 to transfer money to the recipient. Once the payment app 15 has been installed (or if the second mobile device already has the payment app 115 installed when the transaction is initiated), the action can include causing the payment app 115 to output information to complete the transaction. Example information output by the payment app 115 includes returning a unique device identifier of the second mobile device to the first device to allow the first device to complete the transaction at the payment server 130, or the payment app 115 communicating with the payment server 130 to send the tokenized transaction identifier and an identifier of the second device.

In some embodiments, the sender device 110 uses NFC by default to transfer data when both the sender device 110 and recipient device 120 have the application 115 installed. If the recipient device 120 does not have the app 115 installed, the sender device 110 may send the instructions to download the app 115 over a communications protocol defined based on the sender device 110 and recipient device 120. For example, if the sender device 110 is a mobile device executing the ANDROID operating system, the sender device 110 may send the instructions over NFC. If the sender device 110 is a mobile device executing the APPLE IOS operating system, the sender device 110 may use APPLE AIRPLAY to send the instructions to a recipient device 120 also executing IOS and BLUETOOTH to send the instructions to a recipient device 120 that executes ANDROID. In some embodiments, the instructions are sent via a tokenized link that is unique to the transaction.

At block 508, the first mobile device sends the identifier of the second device and the specification of the amount of money to the payment server 130 to cause the transfer of the amount of money from a financial account associated with the first user and a financial account associated with the second user. Alternatively, the second mobile device sends the tokenized transaction identifier to the payment server with the identifier of the second mobile device to cause the server to complete the transaction. If the payment transaction is associated with a specified profile of the first user, the payment server 130 can cause the money to be transferred from the financial account linked to the specified profile.

Figure 6:
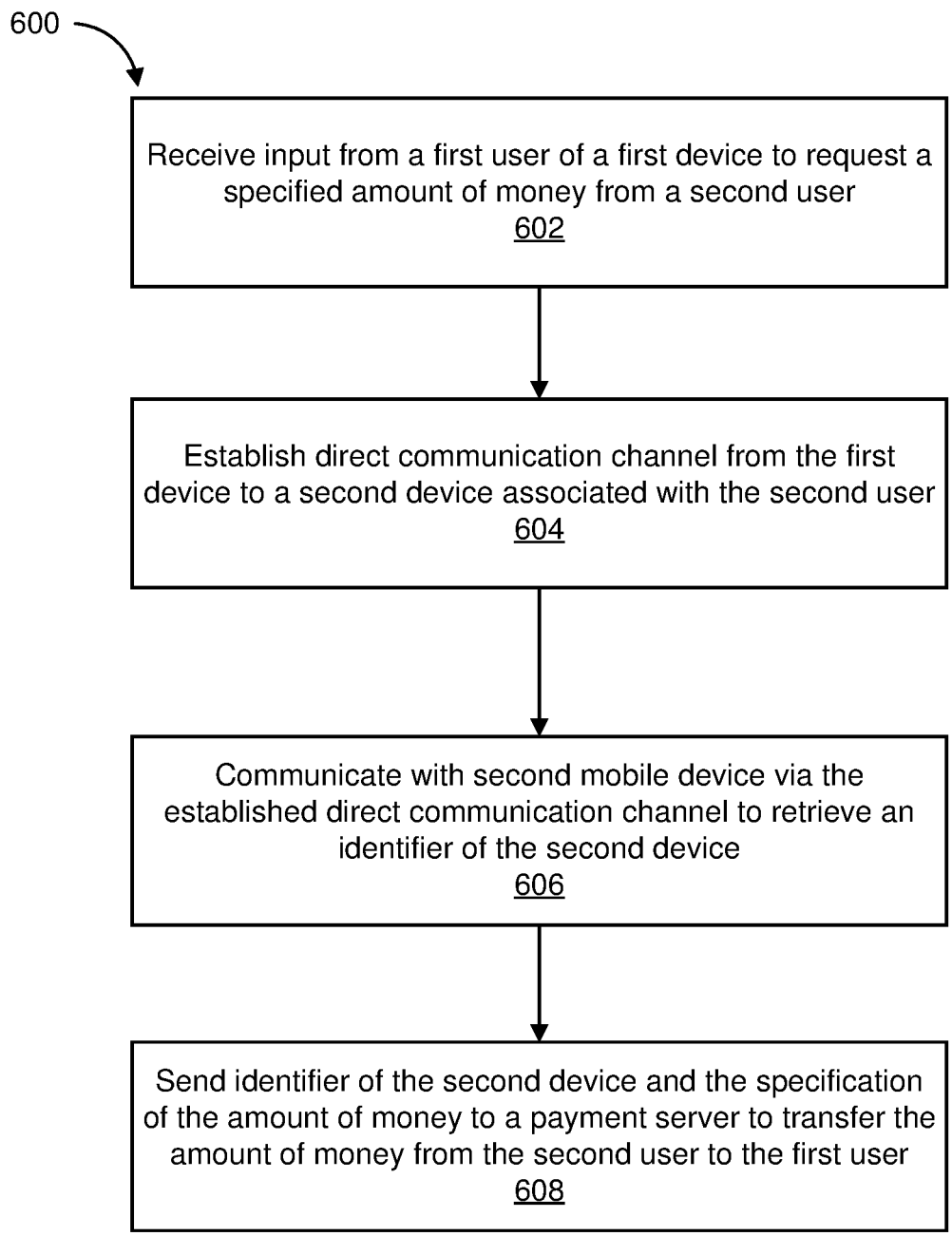
FIG. 6 is a flowchart illustrating another process for initiating an anonymous peer-to-peer payment.

Another embodiment of a process for initiating an anonymous peer-to-peer payment is shown in FIG. 6. The process 600 can be performed by a first mobile device, such as the recipient device 120, executing the payment application 115 and used by a first user who is requesting money from a second user. For example, the process 600 can enable a person, such as a worker delivering food to another person, to request payment from the other person. Some aspects of the process 600 can be similar to the process 500 described with respect to FIG. 5A.

At block 602, the first device receives an input from a first user to request a specified amount of money from a second user. The input can be received at a user interface generated by the payment app 115, such as at an interface similar to that depicted in FIG. 5C. In some cases when the first user provides the input to request an amount of money, the user's input is associated with one of multiple profiles associated with the first user. For example, as described above, a user may have separate business and personal profiles associated with his or her payment server account. When providing the input to request a payment, the first user may manually specify the profile to which the payment should be associated. In other cases, the payment application 115 automatically selects the profile based on rules associated with the profile, such as time-based or geofencing rules. For example, the first user's business profile may be time-limited to specified hours during a day, and the payment application 115 selects the business profile if the input from the first user was received during the specified hours. Similarly, if the first user's business profile is associated with a geofence, the payment app 115 selects the business profile if the first user is inside the geofence and selects a personal profile if the first user is outside of the geofence.

At block 604, the first device establishes a direct communication channel with a second device associated with the second user. At block 606, the first device communicates with the second device via the direct channel to send a tokenized transaction identifier to the second device. In some implementations, the first device also requests approval for the transaction by communicating via the direct channel. The second user can approve or deny the transaction, or modify the amount of money requested by the first user, prior to the second device returning its identifier to the first device or sending the tokenized transaction identifier to the payment server. In other cases, the payment server requests approval from the second user prior to conducting a transaction, after the first device retrieves the second device's identifier.

At block 608, the first device sends the identifier of the second device and the specification of the amount of money requested by the first user to the payment server 130 to cause the transfer of the requested amount of money from a financial account associated with the second user to a financial account associated with the first user.

Figure 7:
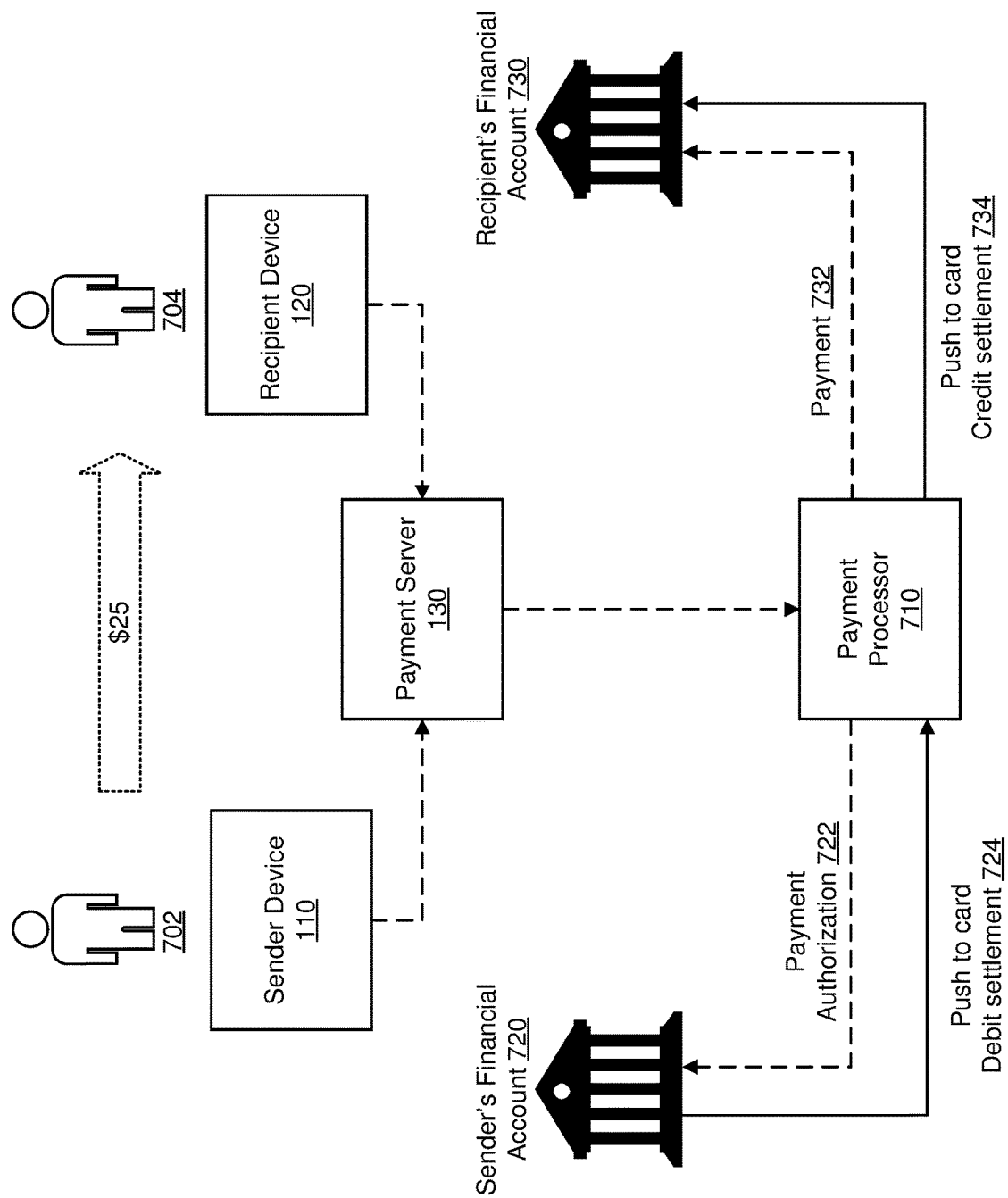
FIG. 7 illustrates example money flow during a peer-to-peer transaction.

FIG. 7 is a diagram illustrating an example money flow during a peer-to-peer transaction as described herein. In FIG. 7, a sender 702 is using the sender device 110 to transfer $25 to a recipient 704 using the recipient device 120. When the sender 702 initiates the transaction, transaction data is passed from the sender device 110 and recipient device 120 to the payment server 130. The payment server 130 communicates with a payment processor 710, which processes the payment of the $25 to the recipient 704. The payment processor 710 transmits a payment authorization 722 to a financial system maintaining the sender's financial account 720, which debits 724 the account. The payment processor 710 then sends the payment 732 and a credit settlement 734 to a financial system maintaining the recipient's financial account 730.

Figure 8:
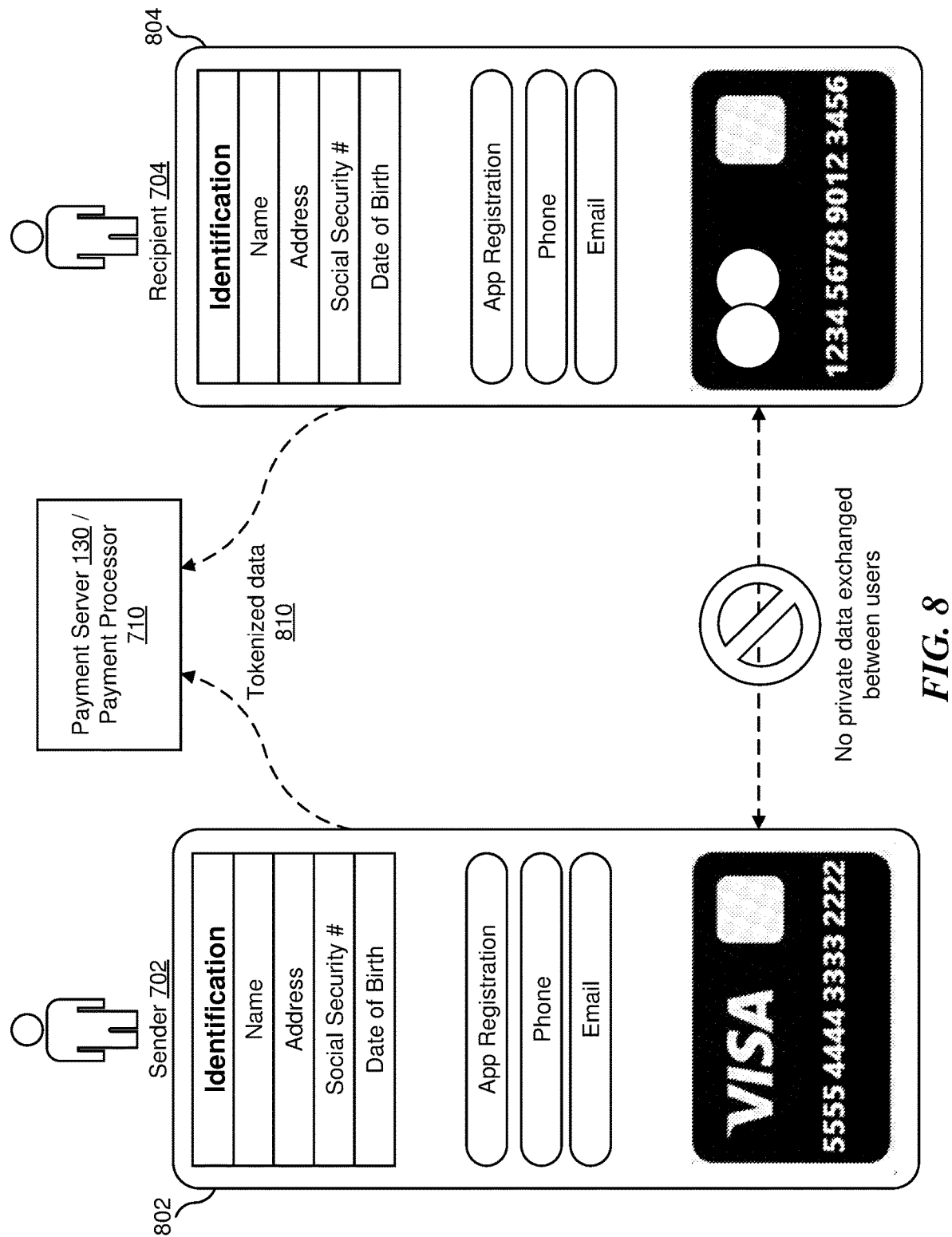
FIG. 8 illustrates example transaction data flow during a peer-to-peer transaction.

FIG. 8 is a diagram illustrating an example transaction data flow during a peer-to-peer transaction as described herein. As shown in FIG. 8, the sender's private information 802 and the recipient's private information 804—including identification data such as name, address, social security number, or date of birth; application registration information such as phone number or email address; and financial information such as a credit card number—is not exchanged between users. Rather, the transaction is enabled by the use of tokenized data 810 at the payment server 130 and payment processor 710. Thus, anonymity of the sender 702 and recipient 704 is maintained.

Example Processing System

Figure 9:
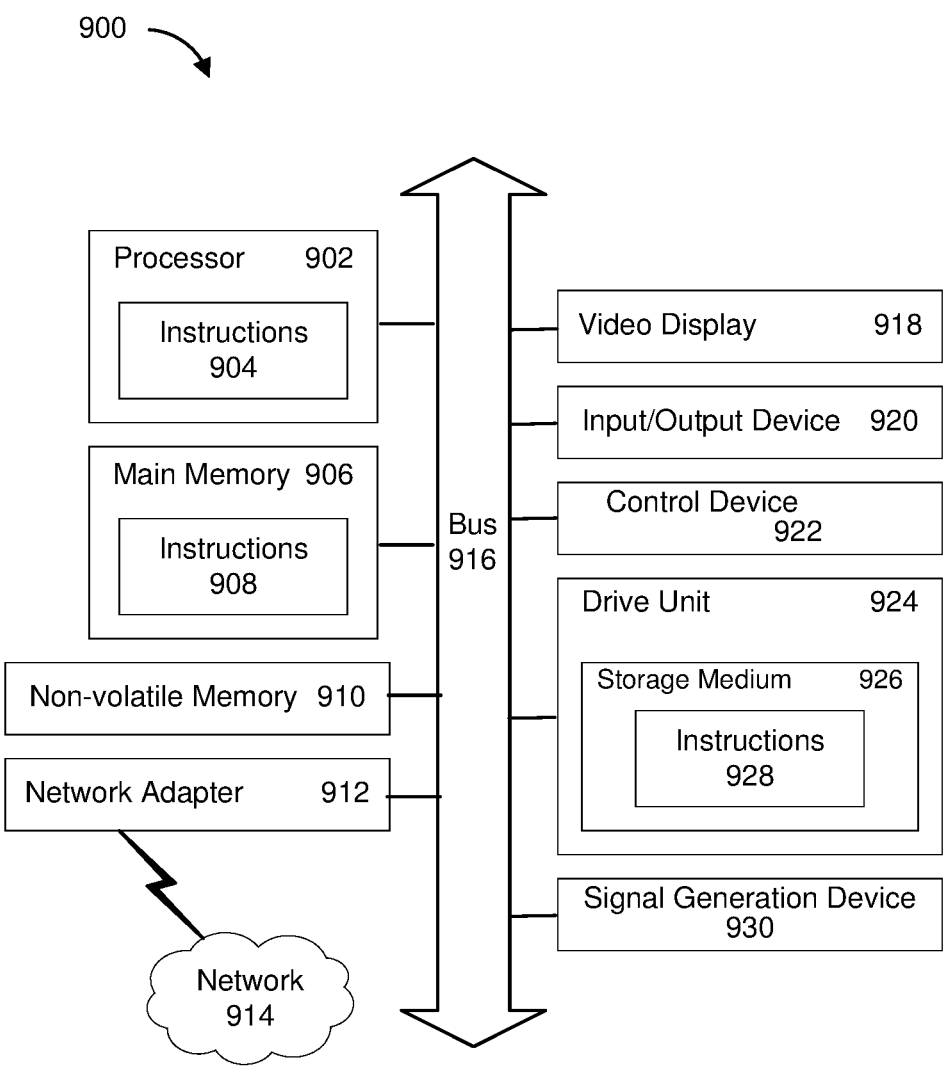
FIG. 9 is a block diagram illustrating an example of a processing system in which at least some operations described herein can be implemented.

FIG. 9 is a block diagram illustrating an example of a processing system 900 in which at least some operations described herein can be implemented. For example, one or more of the sender device 110, recipient device 120, or payment server 130 may be implemented as the example processing system 900. The processing system 900 may include one or more central processing units ("processors") 902, main memory 906, non-volatile memory 910, network adapter 912 (e.g., network interfaces), video display 918, input/output devices 920, control device 922 (e.g., keyboard and pointing devices), drive unit 924 including a storage medium 926, and signal generation device 930 that are communicatively connected to a bus 916. The bus 916 is illustrated as an abstraction that represents any one or more separate physical buses, point to point connections, or both connected by appropriate bridges, adapters, or controllers. The bus 916, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 994 bus, also called "Firewire."

In various embodiments, the processing system 900 operates as part of a user device, although the processing system 900 may also be connected (e.g., wired or wirelessly) to the user device. In a networked deployment, the processing system 900 may operate in the capacity of a server or a client machine in a client-server network environment, or as a peer machine in a peer-to-peer (or distributed) network environment.

The processing system 900 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 900.

While the main memory 906, non-volatile memory 910, and storage medium 926 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 928. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 904, 908, 928) set at various times in various memory and storage devices in a computer, and that, when read and executed by one or more processing units or processors 902, cause the processing system 900 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 910, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 912 enables the processing system 900 to mediate data in a network 914 with an entity that is external to the processing system 900 through any known and/or convenient communications protocol supported by the processing system 900 and the external entity. The network adapter 912 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 912 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it may be stated otherwise above or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing device 500 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory may be volatile or non-volatile memory. In some embodiments, the volatile memory may be considered "non-transitory" in the sense that it is not a transitory signal. Memory space and storage described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method steps or a method step of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above may include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of a fully functioning computers, those skilled in the art will appreciate that the various embodiments are capable of being distributed as a program product in a variety of forms and that the disclosure applies equally, regardless of the particular type of machine or computer-readable media used to actually effect the embodiments.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method of near-field communication push interaction that enables communication between two mobile devices that do not have a corresponding application set, the method comprising:
   generating, at a first mobile device, an application message of a first application, the application message including:
   a unique identifier associated with a receiving device;
   a user content associated with a first user; and
   an interaction hyperlink associated with an interaction webpage, the interaction webpage includes instructions to cause the receiving device to obtain the first application seeded with the unique identifier;
   transmitting, via near-field communication from the first mobile device to a second mobile device, the application message, wherein the second mobile device is the receiving device, the application message configured to generate a push notification on the second mobile device that directs the second mobile device to the interaction webpage;
   in response to execution of the instructions included with the interaction webpage, generating a second user associated with the second mobile device; and
   shifting the user content associated with the first user to the second user.

2. The method of claim 1, further comprising:
   detecting, via an on-board GPS sensor, a physical location of the first mobile device and tying the physical location to the application message.

3. The method of claim 2, further comprising:
   validating the application message as non-fraudulent based on the physical location.

4. The method of claim 2, further comprising:
displaying, via a graphic user interface, suggested options of the user content for the application message based on the physical location.

5. The method of claim 1, wherein the user content is an amount of money associated with a first payment service or first bank account.

6. The method of claim 5, wherein the second user is associated with a second payment service or second bank account.

7. The method of claim 5, wherein the first user is associated with a group of users managed by a single entity, wherein the single entity sets limits on the user content based on any of:
temporal restrictions;
locational restrictions; or
receiver restrictions.

8. The method of claim 7, further comprising:
displaying, via a graphic user interface, suggested options of the user content for the application message based on the physical location.

9. A method of near-field communication push interaction that enables communication between two mobile devices comprising:
generating, at a first mobile device, an application interaction of a first application, the application interaction including:
a unique identifier associated with a receiving device;
a user content associated with a first user; and
a GPS location of the first mobile device;
transmitting, via near-field communication from the first mobile device to a second mobile device associated with a second user, an application interaction message based on the application interaction, wherein the second mobile device is the receiving device, wherein the second device is executing a corresponding instance of the first application; and
shifting the user content associated with the first user to the second user.

10. The method of claim 9, further comprising:
validating the application message as non-fraudulent based on the physical location.

11. The method of claim 9, wherein the user content is an amount of money associated with a first payment service or first bank account.

12. The method of claim 11, wherein the second user is associated with a second payment service or second bank account.

13. The method of claim 11, wherein the first user is associated with a group of users managed by a single entity, wherein the single entity sets limits on the user content based on any of:
temporal restrictions;
locational restrictions; or
receiver restrictions.

14. A system of application interaction comprising:
a machine-readable code placard including a machine-readable code associated with a first user of a first application;
an application server associated with an administrative backend of the first application;
a mobile device including a first memory, and associated with a second user of the first application, the first memory including instructions that when executed cause the mobile device to:
generate an application interaction of the first application, the application interaction including:
an image of the machine-readable code as associated with the first user;
a user content associated with a second user; and
a GPS location of the mobile device; and
transmitting, by the mobile device, the application interaction to the application server; and
an application server associated with an administrative backend of the first application including a second memory, the second memory including instructions that when executed cause the application server to:
coordinate a shift of user content associated with the second user to the first user based on the image of the machine-readable code and the GPS location of the mobile device indicating the mobile device is co-located in a geo-fence with the machine-readable code placard.

15. The system of claim 14, further comprising:
validating the application message as non-fraudulent based on the physical location.

16. The system of claim 14, further comprising:
displaying, via a graphic user interface, suggested options of the user content for the application message based on the physical location.

17. The system of claim 14, wherein the user content is an amount of money associated with a first payment service or first bank account.

18. The system of claim 17, wherein the second user is associated with a second payment service or second bank account.

19. The system of claim 17, wherein the first user is associated with a group of users managed by a single entity, wherein the single entity sets limits on the user content based on any of:
temporal restrictions;
locational restrictions; or
receiver restrictions.

20. The system of claim 14, further comprising:
a second mobile device including a third memory and associated with the first user of the first application, the first memory including instructions that when executed cause the second mobile device to:
display a notification that the user content has been shifted from the second user to the first user.

* * * * *